United States Patent
Levitan et al.

(10) Patent No.: US 6,856,272 B2
(45) Date of Patent: Feb. 15, 2005

(54) METHODS AND APPARATUS FOR DETECTING THREATS IN DIFFERENT AREAS

(75) Inventors: Arthur C. Levitan, Wilton, CT (US); Lester Kosowsky, Stamford, CT (US)

(73) Assignee: Personnel Protection Technoloties LLC, Wilton, CT (US)

( * ) Notice: Subject to any disclaimer, the term of this patent is extended or adjusted under 35 U.S.C. 154(b) by 0 days.

(21) Appl. No.: 10/730,171

(22) Filed: Dec. 8, 2003

(65) Prior Publication Data

US 2004/0183712 A1 Sep. 23, 2004

Related U.S. Application Data

(63) Continuation-in-part of application No. 10/229,761, filed on Aug. 28, 2002, now Pat. No. 6,720,905.

(51) Int. Cl.$^7$ ............................................. G01S 13/86
(52) U.S. Cl. ............................. 342/22; 342/52; 342/53; 342/54; 342/90; 342/91; 342/94; 342/95; 342/96; 342/97
(58) Field of Search .............................. 342/22, 27, 52, 342/53, 54, 55, 74, 75, 81, 90, 91, 92, 93, 94, 95, 96, 97, 114, 115, 176, 179, 180, 191, 192, 195, 196

(56) References Cited

U.S. PATENT DOCUMENTS

| | | | |
|---|---|---|---|
| 3,707,672 A | 12/1972 | Miller et al. | ................. 324/239 |
| 4,031,545 A | 6/1977 | Stein et al. | .................... 378/57 |
| 4,791,427 A | 12/1988 | Raber et al. | |
| 4,794,398 A | 12/1988 | Raber et al. | |
| 5,001,650 A | * 3/1991 | Francis et al. | ............... 348/169 |
| 5,552,705 A | 9/1996 | Keller | ......................... 324/239 |

(List continued on next page.)

OTHER PUBLICATIONS

"A research of moving targets detection and imaging by SAR", Runhong Pan; Gang Li; Xixing Zhu; IGARRS '97. 'Remote Sensing—A Scientific Vision for Sustainable Development', vol. 1, Aug. 3–8, 1997 Ps:498–500.*

P. Phillips, "Personnel and Vehicular Monitoring and Tracking at a Distance", DARPA SBIR, Topic SB022–033, pp. 1–2, downloaded from http://www.zyn.com/sbir/sbres/sbir/dod/darpa/darpasb02–2–033.htm on Jul. 2, 2002.

D. Woodlard and W. Clark, "Terahertz Interferometric Imaging Systems (TIIS) for Detection of Weapons and Explosives", Army SBIR, Topic A02–061, Army Research Office (ARO), pp. 1–3, downloaded from http://www.zyn.com/sbir/sbres/sbir/dod/army/armysb02–2–061.htm on Jul. 2, 2002.

(List continued on next page.)

Primary Examiner—John B. Sotomayor
(74) Attorney, Agent, or Firm—Michael P. Straub; Straub & Pokotylo

(57) ABSTRACT

Methods and apparatus for early detection and identification of a threat such as individuals carrying hidden explosive materials, land mines on roads, etc. are disclosed. Methods comprise transmitting radar signals in the direction of a potential threat, measuring the energy in reflected signals, dynamically generating a threat threshold value from signals received from multiple areas and comparing the energy in the reflected signals corresponding to different areas to the generated threat threshold value. The threat threshold value may be generated by averaging the weighted reflected energy measured from different areas during a single scan of a region including the different areas. The contribution to the threshold from different areas is weighted in some embodiments as a function of the distance from the transmitter and/or receiver to the particular area. Analysis of areas and treating different areas as segments facilitates accurate analysis and display of threat information.

23 Claims, 14 Drawing Sheets

U.S. PATENT DOCUMENTS

| | | | |
|---|---|---|---|
| 6,243,036 B1 | 6/2001 | Chadwick et al. | |
| 6,359,582 B1 | 3/2002 | MacAleese et al. | |
| 6,480,141 B1 | 11/2002 | Toth et al. | 342/22 |
| 6,504,479 B1 * | 1/2003 | Lemons et al. | 340/541 |
| 6,720,874 B2 * | 4/2004 | Fufido et al. | 340/541 |
| 6,720,905 B2 * | 4/2004 | Levitan et al. | 342/22 |
| 6,731,845 B1 * | 5/2004 | Gerdt | 385/116 |
| 2002/0067259 A1 * | 6/2002 | Fufidio et al. | 340/541 |
| 2004/0041724 A1 * | 3/2004 | Levitan et al. | 342/22 |
| 2004/0075738 A1 * | 4/2004 | Burke et al. | 348/143 |

OTHER PUBLICATIONS

K. Kappra, "Explosive Detection System", Army SBIR, Topic A02–037, Army Research Lab (ARL), pp. 1–3, downloaded from http://www.zyn.com/sbir/sbres/sbir/dod/army/armysb02–2–037.htm. on Jul. 2, 2002.

L. Malotky and S. Hyland, "Preventing Aircraft Bombings", The Bridge. v. 28, No. 3, pp. 1–6, Fall, 1998.

"Can Big Brother see right through your clothes? Beyond E–ray Vision", Discover, pp. 24–25, Jul. 2002.

Concealed Weapon Detection (Low Power Radars), AFRL/IF, pp. 1–2, downloaded from http://www.rl.af.mil/div/IFB/techtrans/datasheets/CWD–LPR.html on Aug. 13, 2002.

"Image processing tools for the enhancement of concealed weapon detection", Slamani, M.–A et al; 1999. ICIP 99. Proceedings 1999 International Conference on Image Processing, Oct. 24–28, 1999 Ps: 518–522 vol. 3.

"Remote concealed weapons and explosive detection on people using millimeter–wave holography", McMakin, D.L.; Sheen, D.M. Collins, H.D.; Security Technology, 1996. $30^{th}$ Annual 1996 Int's Carnahan Conf., Oct. 2–4, 1996 Ps:19–25.

"Three dimensional millimeter–wave imaging for concealed weapon detection", Sheen, D.M. McMakin, D.L.; Hall, T.E.; Microwave Theory and Techniques, IEEE Transactions on , vol.: 49 Issue: 9, Sep. 2001 Ps: 1581–1592.

"Privacy algorithm for cylindrical holographic weapons surveillance system", Keller, P.E.; McMakin, D.L.; Sheen, D.M.; McKinnon, A.D. Summet, J.W.; Proc. IEEE $33^{rd}$ Annual 1999 Int'l Carnahan Conference on Security Technology, Oct. 5–7, 1999 Ps: 177–181.

Outdoor passive millimetre wave security screening:. Sinclair, G.N.; Anderton, R.N.; Appleby, R.; Security Technology, 2001. IEEE $35^{th}$ International Carnahan Conference on Oct. 16–19, 2001 Page(s): 172–179.

Millimetre wave aviation security scanner:, Murphy, K.S.J.; Appleby, R.; Sinclair, G.; McClumpha, A.; Tatlock, K.; Doney, R.; Hutchenson, I.; Security Technology, 2002. Proceedings. $36^{th}$ Annual 2002 Int'l Carnahan Conference on, Oct. 20–24, Ps: 162–166.

* cited by examiner

| PARAMETER | VALUE |
|---|---|
| FREQUENCY | 95 GHZ |
| WAVE LENGTH | 0.32 CENTIMETERS |
| ANTENNA GAIN | 43 DB |
| RADAR BANDWIDTH | 475 MHZ |
| NOISE FIGURE | 5 DB |
| LOSSES | 4 DB |
| PEAK TRANSMITTED POWER | 0.1 WATT |
| BEAMWIDTH | 1.15 DEGREES |
| ANTENNA DIAMETER | 19.3 CENTIMETERS |
| ANTENNA EFFICIENCY FACTOR | 55 PER CENT |
| DISTANCE TO TARGET | 100 METERS |
| HEIGHT OF TARGET | 2 METERS |

FIGURE 4

METHODS AND APPARATUS FOR DETECTING THREATS IN DIFFERENT AREAS

RELATED APPLICATIONS

The present application is a continuation-in-part of U.S. patent application Ser. No. 10/229,761 filed Aug. 28, 2002 now U.S. Pat. No. 6,720,905.

FIELD OF THE INVENTION

The invention relates generally to the field of threat detection and, more specifically, to a system and method for identifying potential threats and displaying information indicating the position of the potential threats both indoors and outdoors.

BACKGROUND OF THE INVENTION

The suicide or homicide bomber has been identified as the one threat that is virtually unstoppable. The thinking of the bomber defies all societal norms. With that being said, the logical solution to the problem would be the development of a means for detecting the bomber at a safe distance from a potential target. To date, there are no known concealed weapons or explosive detection systems available that purport to detect a concealed weapon (or weapons) or explosive devices from a distance of more than 20 yards. Reference is made to an article in the July 2002 Discover Magazine entitled "Beyond X-ray Vision" by Ivan Amato for a recent survey of the current state of the technology. Attention is also called to an article in the fall 1998 The Bridge published by the National Academy of Sciences entitled "Preventing Aircraft Bombings" by Lyle Malotky and Sandra Hyland for additional background information on the problem to be solved.

Almost every known detection system is electromagnetic based and requires an individual to pass through a fixed passageway. When metallic objects pass through the passageway, a warning signal is activated because a change in magnetic flux is detected. This type of system either detects or does not detect a metal object and makes no determination relative to the amount of metal present. Keys, jewelry, watches, and metal-framed eyeglasses may all trigger such a system.

U.S. Pat. No. 6,359,582 describes a weapons detector and method utilizing Radar in conjunction with stored spectral signatures. The system is said to be capable of measuring the self-resonant frequencies of weaponry. It is claimed that accuracies of greater than 98% can be obtained at distances, preferably between 4–15 yards. It is also claimed to be capable of detecting metal and non-metal weapons on a human body, in purses, briefcases and under clothing and discerning from objects such as belt buckles, coins, keys, calculators and cellular phones. This system has the disadvantage of relying on the presence of unique spectral signatures, which must be pre-stored or learned by a computer employing artificial intelligence techniques.

Another patent, U.S. Pat. No. 6,243,036, titled Signal Processing for Object Detection System describes another concealed weapon detection system. The patent describes detecting concealed weapons by calculating the difference of a pair of differences between levels of different polarized reflected energy in the time domain, and by using signal processing methods and apparatus to improve the reliability of the detection process. This technique which relies on differences between levels of different polarized reflected energy is difficult and potentially costly to implement.

Information at http://www.nlectc.org/virlib/InfoDetail.asp?intinfoID=201 and http://www.rl.af.mil/div/IFB/tefchtrans/datasheets/CWD-LPR.html, indicates that Lockheed Martin, under contract to the Air Force Research Laboratories and the National Institute of Justice, is in the process of developing a dual-mode (millimeter wave/infrared) camera to detect weapons concealed on an individual. The information indicates that the system will operate at a range of 10 to 40 feet, without the control or cooperation of the individual under surveillance. The described system develops images from the returned Radar energy. The image information is processed using algorithms to automatically detect and recognize concealed weapons. The detection and position information from the Radar sensor would be linked to a second sensor IR or visual camera to display the subject to authorities.

In addition to the above discussed detection systems, there are several new initiatives being pursued under the auspices of the Small Business Innovation Research (SBIR) program in the Concealed Weapons Detection arena. The DARPA SBIR, Topic SB022-033 entitled Personnel and Vehicular Monitoring and Tracking at a Distance seeks to "develop 3D biometric technologies as part of a multi-modal system to detect, track and recognize humans . . . at a distance to support early warning, force protection, and operations against terrorist, criminal and other human based threats." The particular focus of this work is 3D imaging. The Army Research Office (ARO) SBIR Topic A02-061, Terahertz Interferometric Imaging Systems (TIIS) for Detection of Weapons and Explosives seeks to "develop and demonstrate a terahertz-frequency imaging array with sufficient spatial and spectral resolution to enable the rapid and effective detection of concealed weapons and explosives. The envisioned sensing system will provide real-time imaging with adequate sensitivity for the short-range remote interrogation of objects and persons that might be concealing either weapons or explosives" with a parallel focus on collecting "signature information for a set of expected targets and concealment materials." The Army Research Lab (ARL) SBIR, Topic A02-037, Explosive Detection System, is focused on chemical signatures of explosives. Such development programs further highlight the need for improved concealed weapon detection systems. The Air Force SBIR, Topic AF03-123 entitled Hidden Threat Detection Techniques seeks to "capitalize on emerging non-contact nondestructive evaluation detection techniques as well as revolutionary concepts for sensors and detectors and tailor them to specific applications for personnel protection."

In view of the above discussion, it is apparent that there is a need for new or improved systems and methods for rapidly evaluating the threat potential of an individual amongst other individuals at a relatively long distance both indoors and outdoors. It is desirable that at least some systems or methods be capable of being implemented without the need for complex signal processing thereby reducing implementation costs relative to many of the known systems. It is also desirable that the methods and/or apparatus provide an integrated, threat-driven solution to the threat detection problem discussed above.

SUMMARY OF THE INVENTION

The present invention is directed to systems and methods for detecting and displaying information, e.g., location information, about possible threats. Threats may include, for example, individuals carrying concealed weapons, mines placed along a road or various other types of weapons. A visual representation of a region examined for threats is displayed with different areas of the region, e.g., cells, being highlighted and/or displayed differently as a function of a threat assessment made with regard to each particular area of the displayed region. Friend and foe information may be combined on the display so that areas detected to have a signal indicative of a possible threat can be designated with a friend indicator in cases where a friend identification signal has been received from the area.

An exemplary embodiment of a system of the present invention uses Radar to pan an environment for potential targets, measures the difference between the Radar signal level returned or reflected and exploits the difference between normal background areas and threat areas resulting from, e.g., the presence of weapons or other hardware, to present to an operator a visual representation of the examined area with potential threats highlighted using visual markers such as distinctive coloring, particular shapes, or other visual indicia of information, e.g., a potential threat, associated with the different areas which are examined.

In one particular exemplary embodiment, the region to be examined is divided into segments, e.g., cells, corresponding to different physical areas. The distance of the cells from the combined receiver/transmitter unit used in various exemplary embodiments of the present invention is taken into consideration when assessing the amount of detected energy returned from signals transmitted into a particular area. In various embodiments, a threat threshold is determined as a function of a weighted average of detected energy measurements corresponding to multiple areas of a region scanned during an analysis period. In generating the weighted average, energy measurements corresponding to different areas are adjusted, e.g., normalized, as a function of distance to the area from which the signals are received and the expected decrease in power as the distance increases. The weighted energy measurements are averaged to form a value which is used in generating the threat threshold for the corresponding analysis period. The weighted energy measurement corresponding to a particular area, e.g., cell, is compared to the generated threshold and a threat is declared when the returned energy for an area exceeds the dynamically generated threshold level. The threat threshold level is normally generated to be higher than the weighted energy average, e.g., by a fixed or user adjustable amount, to reduce the risk of threats being declared erroneously.

The method and apparatus of the present invention can be mounted on mobile devices or positioned at fixed locations. The mobile mounted embodiments can be used by trucks and/or other vehicles to identify possible roadside threats or threats which may exist in the vehicle's direction of travel. Such threats include, e.g., above ground mines, improvised explosive devices and/or other types of weapons.

In cases where hidden weapons on individuals is the primary concern the display may limit the visual display of information to areas, e.g., cells of a scanned region, where a human presence is detected, e.g., through the use of thermal or other information. Such an embodiment reduces clutter on the display and helps a user focus on potential threats.

Numerous additional features, embodiments and benefits of the methods and apparatus of the present invention are discussed below in the detailed description which follows.

BRIEF DESCRIPTION OF THE DRAWINGS

FIG. 4 illustrates a typical set of parameters used to implement a system in accordance with the invention.

DETAILED DESCRIPTION

Figure 1:
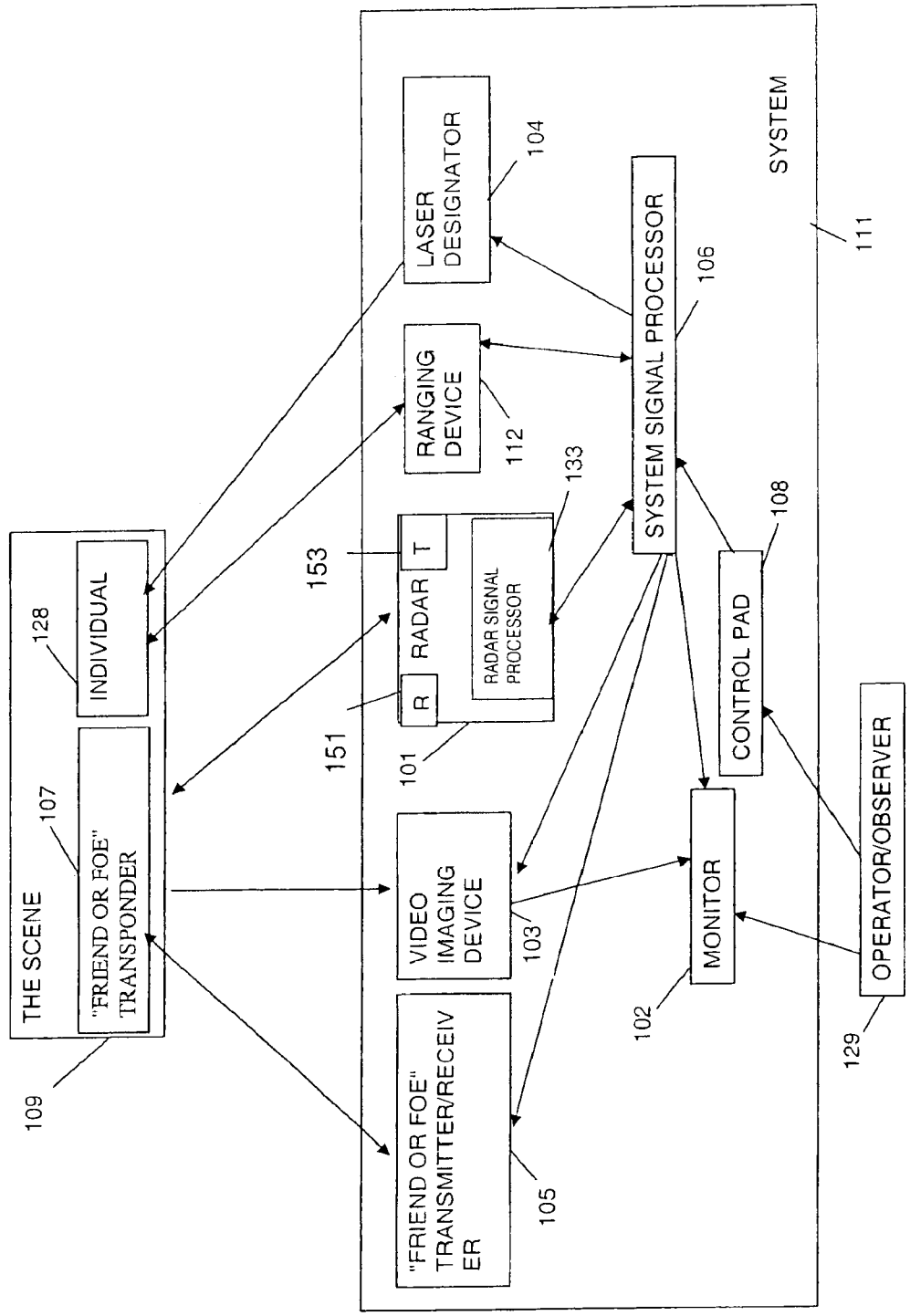
FIG. 1 illustrates an exemplary system and various signals passed between the system components in accordance with the present invention.

Referring to FIG. 1, the exemplary concealed weapon/ explosive detection System 111 may advantageously be positioned more than 100 yards from the Scene 109 to be monitored. The system 111 includes various components 101, 102, 103, 104, 105, 106, 108, 133 coupled together to permit the communication and/or transmission of signals and/or control information between the elements as shown in FIG. 1 through the use of arrows. The Operator/Observer 129 interacts through Control Pad 108 to direct System Signal Processor (SSP) 106 to control each of the operator selectable options of the System 111. The Operator/Observer 129 observes the Scene 109 by using the Monitor 102. The Control Pad 108 allows the Operator to interact with each of the elements of the System 111 through commands to the SSP 106. System 111 can, and in various embodiments does, implement an automated scanning process, without the need for a human operator. Also, the entire System 111 can, and in various embodiments is, fixed mounted while in other embodiments it is mounted on a vehicle or other movable platform.

The SSP 106, among its other functions, advantageously processes the information received from each of the System 111 sensors (Radar 101, Video Imaging Device 103, "Friend or Foe" Transmitter/Receiver 105,) to provide near real time representation of the Scene 109 and all its calculated and determined informational tags (signal strength, distance, direction, etc).

In the preferred implementation of the subject system and method the Operator/Observer 129 advantageously decides the angular limits of the Scene 109 to be evaluated by viewing the Scene 109 on the Monitor 102 as presented by the Video Imaging Device 103 and inputting control instructions via Control Pad 108. Using the Control Pad 108, the Operator/Observer 129 causes the SSP 106 to zoom or frame-size Video Imaging Device 103 to set the angular limits of the depicted portion of Scene 109. For the purpose of this description, some activities are described as occurring sequentially, but the preferred embodiment and utilization of the subject system will beneficially exploit many of the features and scene presentations through actual or essentially simultaneous activities of the individual components.

Referring to FIGS. 1 and 2, the Radar 101 rapidly and continuously pans over the Scene 109 as directed by SSP 106. The SSP Radar instructions would advantageously include the lateral start and stop points to pan the selected portion of Scene 109. The Radar 101 includes a receiver 151 and a transmitter 153. The receiver can measure received signal values, e.g., energy values. The Video Imaging Device 103 presents a wide-angle representation of the horizontal angular width of the selected portion of Scene 109 in response to the instructions of SSP 106, which in turn is responsive to inputs from Control Pad 108. Alternatively, the camera and monitor could utilize the infrared band, or other non-visual portion of the frequency spectrum, for use in low-light or nighttime conditions, as an example. The Radar 101, the Video Imaging Device 103, the "Friend or Foe" Transmitter/Receiver 105, and the Laser Designator 104 simultaneously "view" the Scene 109. SSP 106 advantageously causes the center of the video image presented on the Monitor 102 to correspond to the center of the scan of the Radar 101. However, the SSP 106 may either slave the Radar to scan the scene depicted on Monitor 102, as directed by Operator/Observer 129, or the Video Imaging Device 103 could be slaved to show the area being panned by the Radar 101, wherein the Operator/Observer 129 may advantageously direct the Radar 101's scanning area through manipulation of Control Pad 108, and thence SSP 106 directing Radar 101. The Radar 101 transmits its signal incrementally toward individual targets of the Scene 109 as it pans over the Scene 109, and the Radar Signal Processor 133 measures the amount of the transmitted signal that is reflected from the Scene 109 and detected by Radar 101. The Radar Signal Processor 133 sends the detected signal data to SSP 106.

Figure 2A:
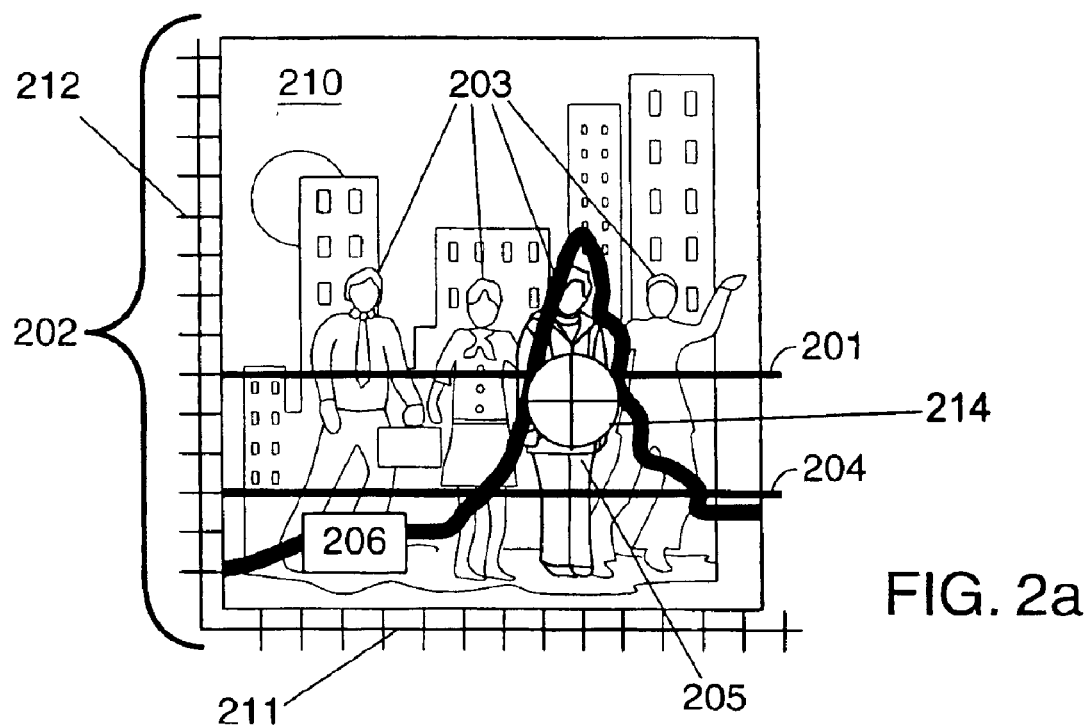
FIGS. 2a, 2b illustrate the appearance of the image display on the monitor, in the video image view, through the target acquisition process including superimposing threshold and signal strength variations on the video image for an outdoor application.
Figure 2B:
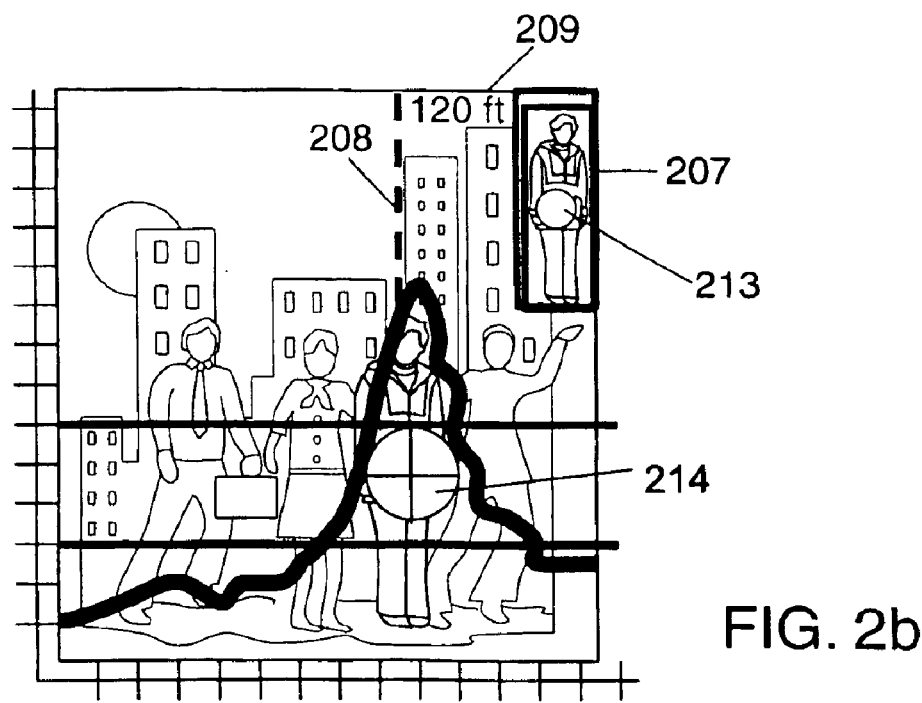
Figure 2C:
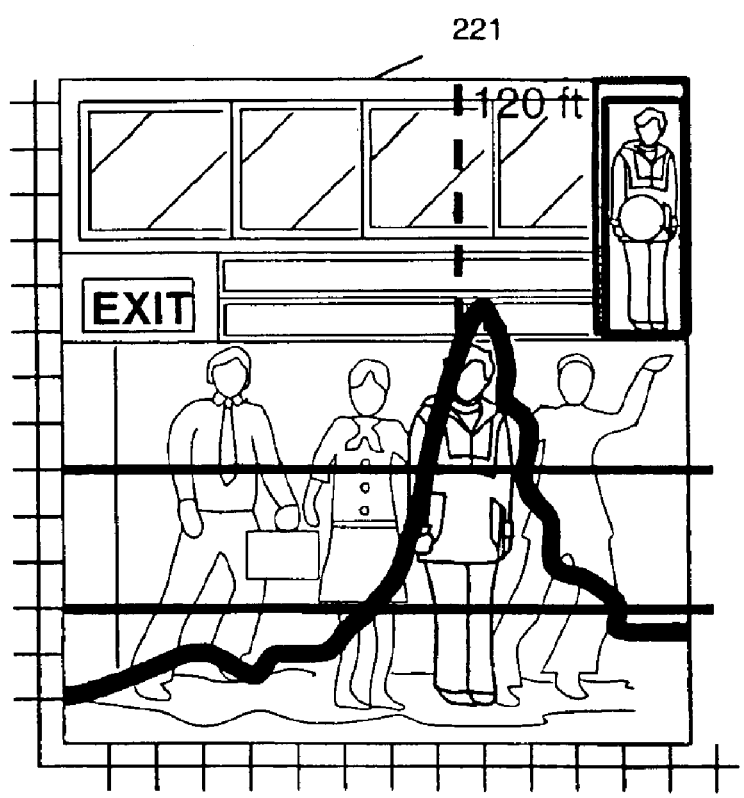
FIG. 2c illustrates the appearance of the image display on the monitor, in the video image view, through the target acquisition process including superimposing threshold and signal strength variations on the video image for an indoor application.

FIGS. 2a, 2b, 2c illustrate the appearance of the image display as it may appear on monitor 102 at different points during the target acquisition process. The SSP 106 may advantageously calculate the average of the detected signals from Scene 109, hereinafter the Average Detected Signals 204 (of FIG. 2). Said average may be an average, e.g. of signal power or some other signal value such as a detected signal amplitude or intensity, which is a function of the detected returned signal. The average detected Radar return signal is calculated by utilizing the reflected signal data at each incremental pointing angle of Radar 101 or at least a plurality, e.g., majority of the pointing angles, from the leftmost to the rightmost extreme of the portion of Scene 109 being scanned. Since, in the exemplary embodiment, the Radar 101 pans over the Scene 109 at a uniform rate, the SSP 106 samples the detected reflected signal data across the scene and calculates and re-adjusts the Average Detected Signals 204 for every Radar 101 pan over the Scene 109. The SSP 106 next calculates a threshold at a pre-determined amount above the Average Detected Signals. Alternatively, the threshold could be arbitrarily selected by the user/operator. Also, a user-selected reference line could be implemented in place of Average Detected Signals 204. The SSP 106 causes the Monitor 102 to depict the Average Detected Signals 204 and the value of the threshold 201 on Monitor 102. The pre-determined amount above the Average Detected Signals 204 may be user selectable. A level of 10 times (10 dB) the Average Detected Signals is a beneficial nominal amount and is an exemplary value that can be used.

The SSP 106 causes Monitor 102 to simultaneously depict the detected signals as a varying continuum 206 superimposed on the pictured Scene 210 as well as the Average Detected Signals 204 and the threshold 201.

FIG. 2a represents the pictured Scene 210, which may be a portion of Scene 109 of FIG. 1, as it is presented on the Monitor 102 to the Operator/Observer 129 and which also represents the area scanned by Radar 101. At any given time, the Scene 210 includes candidate, or potential threats 203. The reflected signal data is advantageously represented on the vertical axis 212 as a level relative to the Average Detected Signals in dB. (A level higher by 3 dB represents twice as much signal; a level higher by 10 dB represents ten times as much signal). SSP 106 causes Monitor 102 to superimpose the detected signal 206 over the Individuals 203 by synching the aiming direction of Radar 101 with the associated position on horizontal axis 211 on the Monitor 102. The horizontal axis 211 is the angular limit of pictured Scene 210 as selected by the Operator/Observer 129. Whenever the detected signal 204 exceeds the threshold 201, the SSP 106 notes the Radar 101 aiming direction (the Noted Position 208 in FIG. 2b) within the scanned Scene 210. In FIG. 2B, by way of example, the detected signals 204 data reaches a peak at the Noted Position 208 at which the threat appears, and is superimposed on the image of the threatening Individual at the Noted Position 208. FIG. 2b further depicts a "picture in picture" image which is displayed by SSP 106 on Monitor 102, for each noted position, and is thereby presented to the Operator/Observer 129 on Monitor 102. The Individual at Noted Position 208 appears in the inset box 207 ("picture in picture") and the Noted Position 208 is marked on the pictured Scene 210 as directed by SSP 106. SSP 106 may also advantageously activate a visual, aural, or other alarm (not shown) at this time.

SSP 106 also uses the Noted Position 208 to cause the "Friend or Foe" Transmitter/Receiver 105 (FIG. 1) to transmit an interrogation signal in that direction. If the Individual 128 is equipped with a correctly configured "Friend or Foe" Transponder 107, e.g., one equipped with the proper response codes, the response is transmitted by "Friend or Foe" Transponder 107 to "Friend or Foe" Transmitter/Receiver 105, which will send a message indicating "Friend" to SSP 106. SSP 106 will thereupon cause Monitor 102 to superimpose the "Friend" response on the Monitor 102 at a position in the picture corresponding to the Noted Position 208. Further, the "picture in picture" could then be deactivated by SSP 106 via another Monitor 102 instruction. If the Individual is not so equipped, the SSP 106 does not receive the transponder message indicating "Friend", and thereupon directs the Laser Designator 104 to be pointed at and to illuminate the Individual 128 by aiming in correspondence to the Noted Position 208 and activating the laser beam. Alternatively, an illuminating beam of a wavelength not visible to the naked eye could be used instead of a laser, so that a viewer wearing special eye pieces, or viewing a specialized monitor screen, could see the target of the illumination, but the subject of the illumination would not know that he was being so targeted. By virtue of an advantageous embodiment of the Radar 101, the distance to the target is obtained simultaneously with the resultant reflected energy from the target and that distance is passed to SSP 106, and SSP 106 causes Monitor 102 to display the distance measurement at the Noted Position 208, which would effectively label the target on the Monitor 102, as depicted in FIGS. 2b and 2c.

The Radar 101 continues to pan over the Scene 109 and the Radar 101 will re-detect and constantly update the location of a detected signal in excess of the threshold, and will automatically note the position of this signal, which will be different than the original Noted Position 208, if the target has moved. The Video Imaging Device 103 and Monitor 102 continue to present the wide-angle view of the Scene 210 and Laser Designator 104, "Friend or Foe" Transmitter/Receiver 105 are directed by SSP 106 to aim at the new Noted Position 208, continuously refreshing the data and image presentation at each new Noted Position 208, effectively "following" the targeted Individual 128 who caused the threshold to be exceeded. The pan rate of the Radar 101 over the Scene 109 is rapid enough to allow the light of the Laser Designator 104 to appear to the Operator/Observer 129 to be stationary on each designated Individual 128 (visual persistence). If other Individuals 128 are determined to be threats (additional signal returns from a position more than a prescribed amount from the first Noted Position 208, advantageously two feet, exceed the threshold) the SSP 106 will create an additional "picture in picture" of the additional Noted Position (not shown) on the Monitor 102, marking each threat by Laser Designator 104, and noting on Monitor 102 the Distance and video image markers at each new Noted Position.

The reflected detected signal that results from the illumination of the potential threatening individual by the narrow beam Radar is likely to be greatest when there are metal objects present. The more metal objects, the greater the signal reflected. Metal objects with corners, like nails that are used to augment the killing power of an explosive device, provide a greater signal. Metal objects that are spherical like bearings or cylindrical-like bullets, also reflect greater signals. The present invention does not require pre-stored or learned signatures. The present invention establishes a reference signal threshold (Average Detected Signals) in real time from the pictured Scene 210 and relies on the fact that the aforementioned metal or other reflective objects are likely to reflect sufficient energy to exceed that threshold whereas a few incidental metal objects carried by an innocent individual is not likely to exceed the threshold. The use of the video imaging system permits the operator to distinguish between individuals carrying weapons in the open from those carrying concealed weapons and/or explosives.

The narrow beam Radar provides range to the target and velocity of the target. Several techniques well known to those skilled in the art can, and in various embodiments are, used to augment the signal return. Examples of such techniques include circular polarization and multi-frequency transmissions. In addition, a high range resolution mode of operation (short pulse or other means), could provide additional discrimination data within the populated cell. The Radar beam should be narrow enough to be able to isolate an individual from other individuals, but wide enough to encompass the whole individual. Dependent upon scenarios presented by the user community, the parameter specifications for the Radar will be determined. The signal strength returned from the target is proportional to the size of the antenna, the frequency of the Radar, the power transmitted as well as the distance to the target and the reflectance of the target. Various features of the present invention are directed to one or more of the following long range detection of the threat, minimal signal processing, self-calibration, no requirement that the system be re-trained for each new weapon or configuration, low cost, light weight and simplicity of operation (including both manual and automatic modes).

Figure 3A:
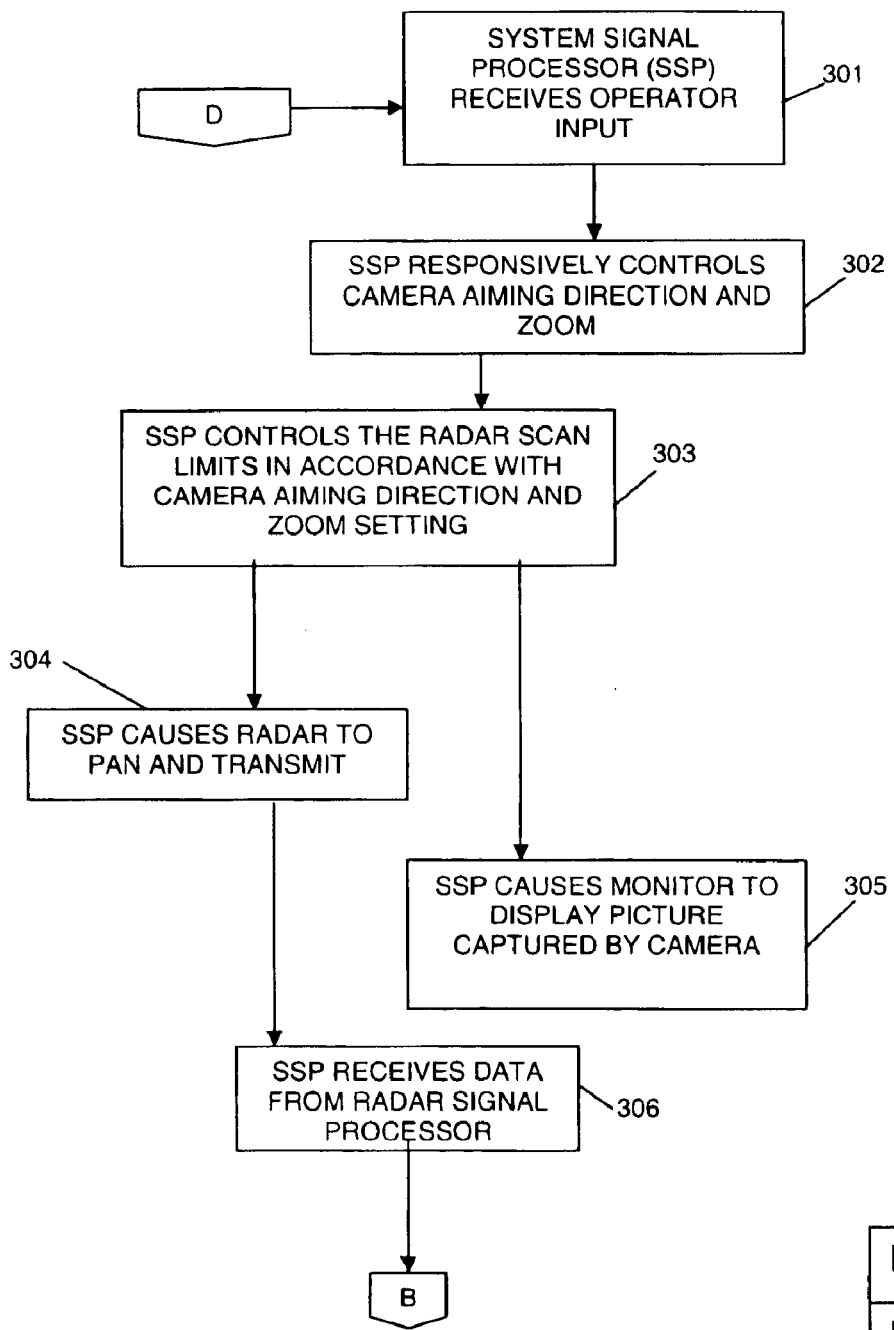
FIG. 3, which comprises the combination of FIGS. 3a through 3c, is a flow chart illustrating steps performed by a System Signal Processor in accordance with the method of the present invention.
Figure 3B:
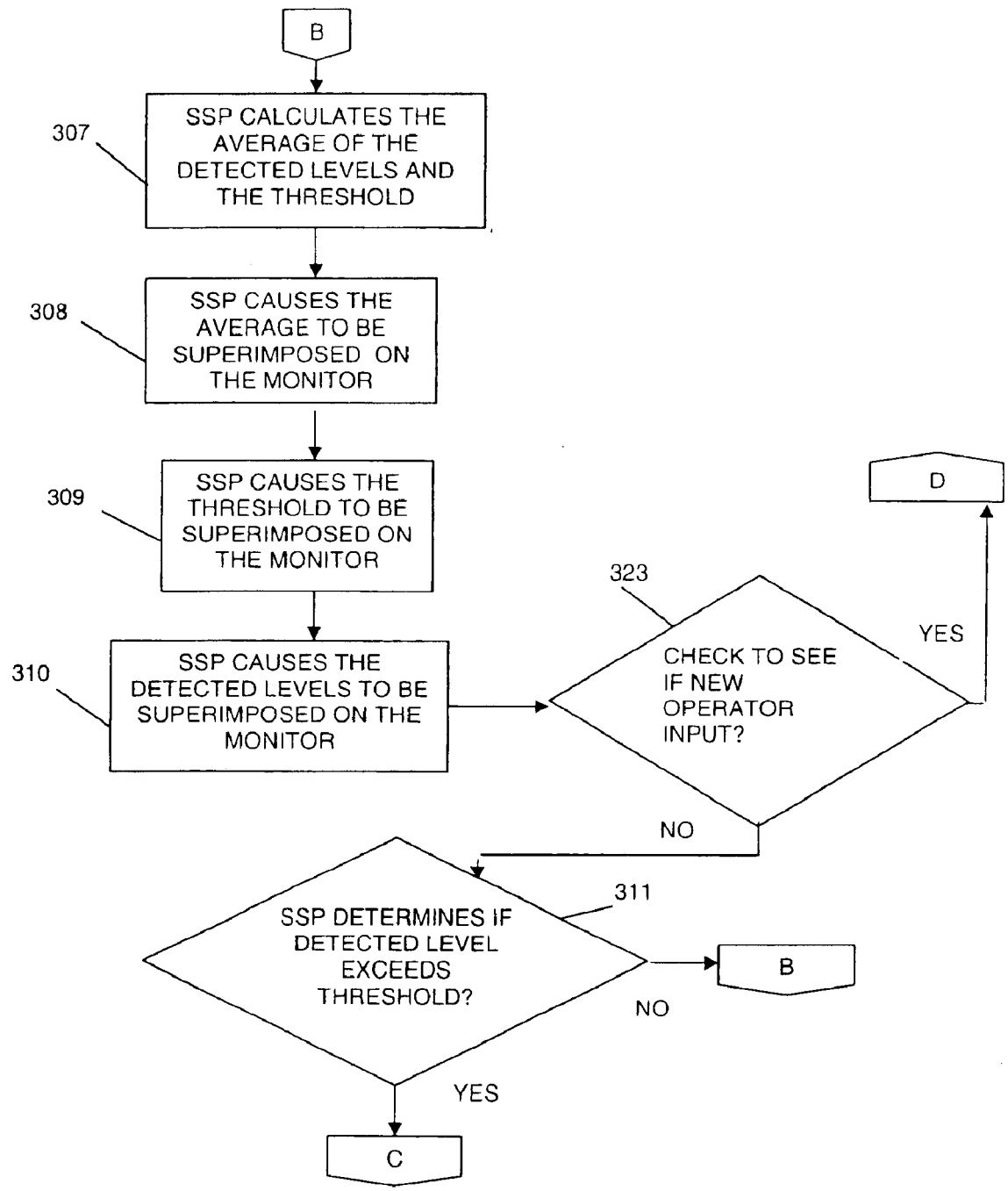
Figure 3C:
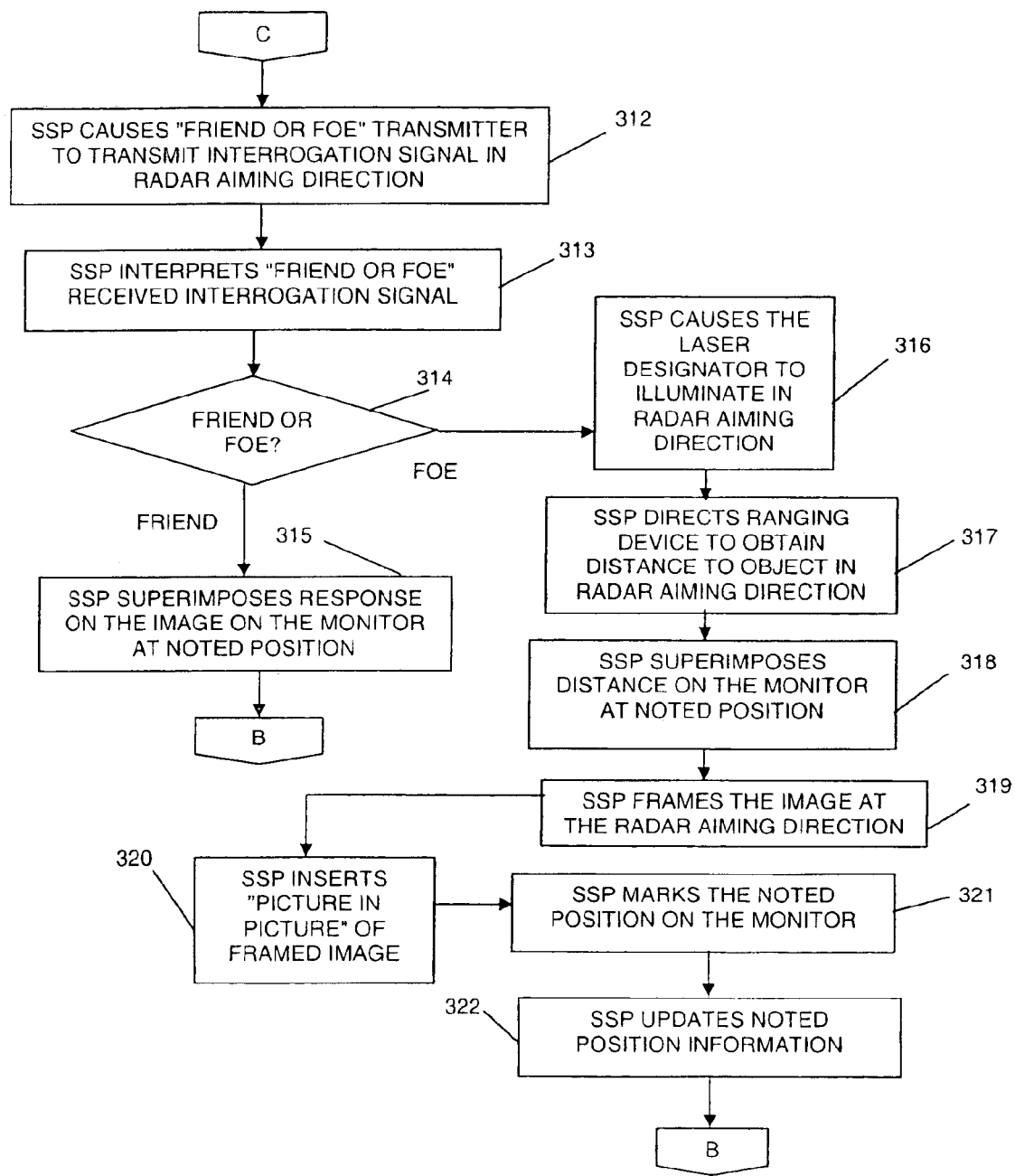

FIG. 3 which comprises the combination of FIGS. 3a, 3b and 3c, illustrates the System Signal Processor (SSP) process flow of the invention. Referring to FIG. 3a, the SSP 106 receives input from the operator at step 301, and in response to the input, controls the camera aiming direction and the size of the photographed scene (zoom) in step 302. The SSP then causes the Radar scan limits to be in accordance with the camera's aiming direction and zoom setting in step 303. In steps 304 and 305, the SSP 106 causes the Radar 101 to pan according to the scan limits and transmit a continuous signal, and causes the Monitor 102 to display the picture as photographed by the camera 103. The SSP 106 receives the detected signal data from the Radar 101 in step 306.

Referring to FIG. 3b, the SSP 106 next calculates the average of the received detected levels and the threshold in step 307, and in steps 308 and 309 causes the average and the threshold to be superimposed on the Monitor 102, advantageously as straight horizontal lines. In step 310, the SSP 106 causes the detected levels to be superimposed on the Monitor 102, corresponding to the Radar aiming direction at the time of each detected level, advantageously as a curved line or as a plurality of short connected lines. In step 323, the SSP 106 checks to see if new operator input had been received, and if so, returns to step 301. If not, it proceeds to step 311, wherein it determines if the detected level exceeded the threshold. If not, it returns to step 307. If so, it proceeds to step 312.

Referring to FIG. 3c, in step 312, the SSP 106 causes the "Friend or Foe" transmitter 105 to transmit an interrogation signal in the direction that the Radar 101 was presently aimed corresponding to the Noted Position, and in step 313 the SSP 106 receives the response signal (if any) from the transmitter 101. In step 314, the SSP determines whether there was a pre-determined "Friend" response, and if so, classifies the target as "Friend" and proceeds to step 315, where the SSP superimposes the "Friend" response on the Monitor at the Noted Position corresponding to the time of the threshold being exceeded and then returns to step 307.

If the pre-determined "Friend" response is not detected in step 314, the SSP 106 next causes the laser 104 to illuminate in the Radar aiming direction corresponding to the Noted Position at step 316. The SSP 106 obtains the distance to the object in the Radar aiming direction in step 317, and in step 318 superimpose that distance on the Monitor 102 at the Noted Position. Next, in step 319 the SSP frames the image at approximately the size of a human at the Noted Position and in step 320 inserts that framed image as a "picture in picture" in a corner of the Monitor 102. Simultaneously, the SSP 106 marks the Noted Position on the primary display of the Monitor 102 at step 321. Then in step 322 the SSP 106 updates the Noted Position information. In step 322, if another detected signal exceeds the threshold near the Noted Position, the SSP 106 would replace the old Noted Position with the subsequent Noted Position. If the next Noted Position is not near the first Noted Position, then the SSP 106 would treat that next Noted Position as an additional Noted Position on the Monitor 102, including using an additional picture in picture for that Noted Position. From step 322 the SSP 106 returns to step 307.

FIG. 4 illustrates an exemplary set 400 of design parameters. Parameters 413 and corresponding exemplary values 414 are illustrated in the left and right columns, respectively. The exemplary values were selected with practical considerations in mind. Such considerations include the availability of components, acceptable operating frequencies, an antenna size that is manageable, beamwidths that are narrow enough to pinpoint the target, power levels that are safe, etc. The frequency, 95 Ghz 401, f, is selected from the historical possibilities that were initially determined by analysis to be least affected by atmospheric conditions. The frequency should be high enough for the resultant antenna size to be small enough to be portable and narrow-beamed to encompass a man-size target. In other embodiments for fixed installation, i.e., not portable, or different design distances, different frequencies can be chosen. Since this class of frequencies has been used extensively, components are widely available. The wavelength, 402, λ, is calculated from the frequency. The antenna gain 403, G, is derived from size of the antenna 409, which is based on the beamwidth 408, α, selected to encompass the target. The antenna efficiency factor 410, η, is based on the electric field distribution over the antenna and the total radiation efficiency associated with various losses, including spillover, ohmic heating, phase nonuniformity, blockage, surface roughness, etc. and is typically equal to 55 percent. The Radar receiver bandwidth 404, B, is advantageously selected to be 475 MHz or 0.5 per cent and is a design parameter. It is defined as the frequency spread around the center frequency where the receiver response to an input no more than half that at the peak center frequency. Noise FIG. 405, $N_F$, is a measure of the sensitivity of the Radar Receiver and is a design parameter. For an inexpensive receiver a Noise Figure of 5 dB is assumed. The Losses 406, $L_T$, is defined as the loss between the transmitter and antenna, receiver and antenna and other unexplained losses. A good "catch-all" value that has empirical basis is 4 dB. The Peak Transmitted Power 407, $P_T$, advantageously at 0.1 watt is selected to be as low as practicable to minimize unnecessary exposure of the innocent population and is a design parameter. The distance to the target 411 is advantageously selected to be 100 meters and is a design parameter, which in conjunction with the height of the anticipated target 412 of 2 meters drives much of the Radar design.

The calculation of the signal strength and the signal strength dependencies as set forth below describe how the exemplary set of design parameters of FIG. 4 determine the performance of the system and how some of the design parameters are determined from the exemplary system requirements. The energy reflected from a target competes with background noise from many sources. The Radar Range Equation rearranged to calculate Signal to Noise Ratio $$\frac{P_T G^2 \lambda^2 \sigma}{(4\pi)^3 R^4 K T_0 B N_F L_T}$$

explains the ability of Radar to detect a target. The signal to noise ratio is directly proportional to the Transmitted Power 407, $P_T$, the square of the Antenna Gain 403, G, the square of the Wavelength 402, λ, and the Radar Cross Section of the target, σ, and inversely proportional to the fourth power of the Distance to the target 411, R, the Bandwidth of the Receiver 404, B, the Noise FIG. 405, $N_F$, and miscellaneous Losses 406, $L_T$. The calculation of the Signal to Noise Ratio for an embodiment of the subject invention as beneficially described by the result of substituting the parameters of FIG. 4 in the above described Radar Range Equation is 3.6 dB or 2.3 times more than the noise present in the system. Since the target for the subject invention is an individual, the length of the arc at a distance to the target should encompass the height of an individual. Assuming an exemplary 2 meter tall individual, the calculation determines the resultant angle or beamwidth to be 1.15 degrees, for an exemplary distance to the individual of 100 meters. The beamwidth determines the diameter of the antenna at the exemplary frequency of 95 GHz to be 0.193 meters based on the relationship understood by those skilled in the art to be Diameter, D, equals a constant factor, typically 1.22, times the speed of light, c, and divided by the product of the beamwidth and the frequency, f, beneficially represented as $$D = \frac{1.22(c)}{(f)(\text{Beamwidth})}$$

The Gain of the antenna, G, given the exemplary frequency of 95 GHz, a Diameter, D, of 0.193 meters, is determined based on the relationship understood by those skilled in the art to be equal to an antenna efficiency factor, η, typically 55%, times the product of the parameter pi, π, the antenna diameter, D, times the frequency, f, divided by the speed of light, c, all to the second power beneficially represented as $$G = \eta(\pi D f/c)^2$$

It should be noted that a pointing accuracy of one-tenth the beamwidth is a reasonable expectation.

Additional exemplary embodiments of the invention will now be discussed in which a region to be examined for possible threats is treated as being comprised of a plurality of cells, e.g., cells having different range and azimuth relationships to the transmitter, receiver and/or a combined receiver transmitter commonly used in various embodiments of the invention to implement Radar 101. In these additional embodiments the average detected Radar return signal for each cell is beneficially calculated by utilizing the reflected signals from each populated range-azimuth cell, as modified by a range attenuation factor corresponding to the particular cell from which the signals are received. In this manner, range is taken into consideration when processing signals from different cells with weighting being used to perform what may be described as a normalization process so that returned energy from different cells can be used in generating a threshold suitable for detecting a threat in any of the cells being examined. As will be discussed below, in several cell embodiments, the SSP 106 sums the modified detected reflected signal data, e.g., weighted measured energy values for different cells or a beneficially selected subset of the cells in the scene being examined, and calculates and re-adjusts an Average Detected Signal, e.g., average energy value generated by the weighted measured energy values, for every Radar 101 cycle over the Scene 109. The subset of cells in the scene may be, e.g., human populated cells and/or cells populated by items believed to pose a potential threat such as land mines or other military equipment. In the cell embodiments, as will be discussed further below, the SSP 106 calculates a threat threshold from the weighted detected energy values, e.g., by adding user selected or predetermined offset amount to the average energy value determined from the range adjusted detected energy values corresponding to one or more cells. Alternatively, the threat threshold could be arbitrarily selected by the user/operator 129.

Assuming FIG. 2b corresponds to a multi-cell implementation, by way of example, the populated range-azimuth cell corresponding to Noted Position 208 has a returned detected signal energy level which exceeds the generated threat threshold thereby providing a way to detect the cell in which the exemplary threat appears.

In some embodiments, the operator selectively aims the Radar 101 and/or camera 103 at a person who appears on the monitor 102 and the SSP 106 then causes the Radar 101 to transmit in the direction of that person. The SSP 106 receives the detected signal data from the Radar 101 and performs a threat analysis with the results being superimposed on the displayed image on the monitor 102 which includes the visual image of the person and corresponding region at which the radar 101 or camera 103 were pointed.

FIGS. 2a and 2b illustrates the appearance of an exemplary image display on the monitor of an outdoor scene, at the completion of a target acquisition process which includes superimposing a cross-hair 214 on the video image as shown in FIGS. 2a and 2b. FIG. 2c illustrates the appearance of an exemplary image display 221 on the monitor of an indoor scene that may be generated in accordance with the invention. The view provided in exemplary images of FIGS. 2a 2b and 2c shall hereinafter be referred to as a video image view.

In another embodiment of the invention, an alternative visual display format for displaying information about a scanned region is used. In this alternative format, shown in FIG. 5, a perspective view, e.g., "bird's-eye" view is used. With the perspective view presentation, the scene 109 is subdivided into cells, each cell corresponding to a different distance and/or angle, e.g., azimuth, from the transmitter and/or signal detector included in Radar 101. Those range azimuth cells which are populated are highlighted as an array of rectangles, e.g. a rectangle with grid lines. Each populated range azimuth cell is further classified, and color-coded and/or symbolically-coded to allow the operator 129 to quickly distinguish between targets and identify threats.

Figure 5:
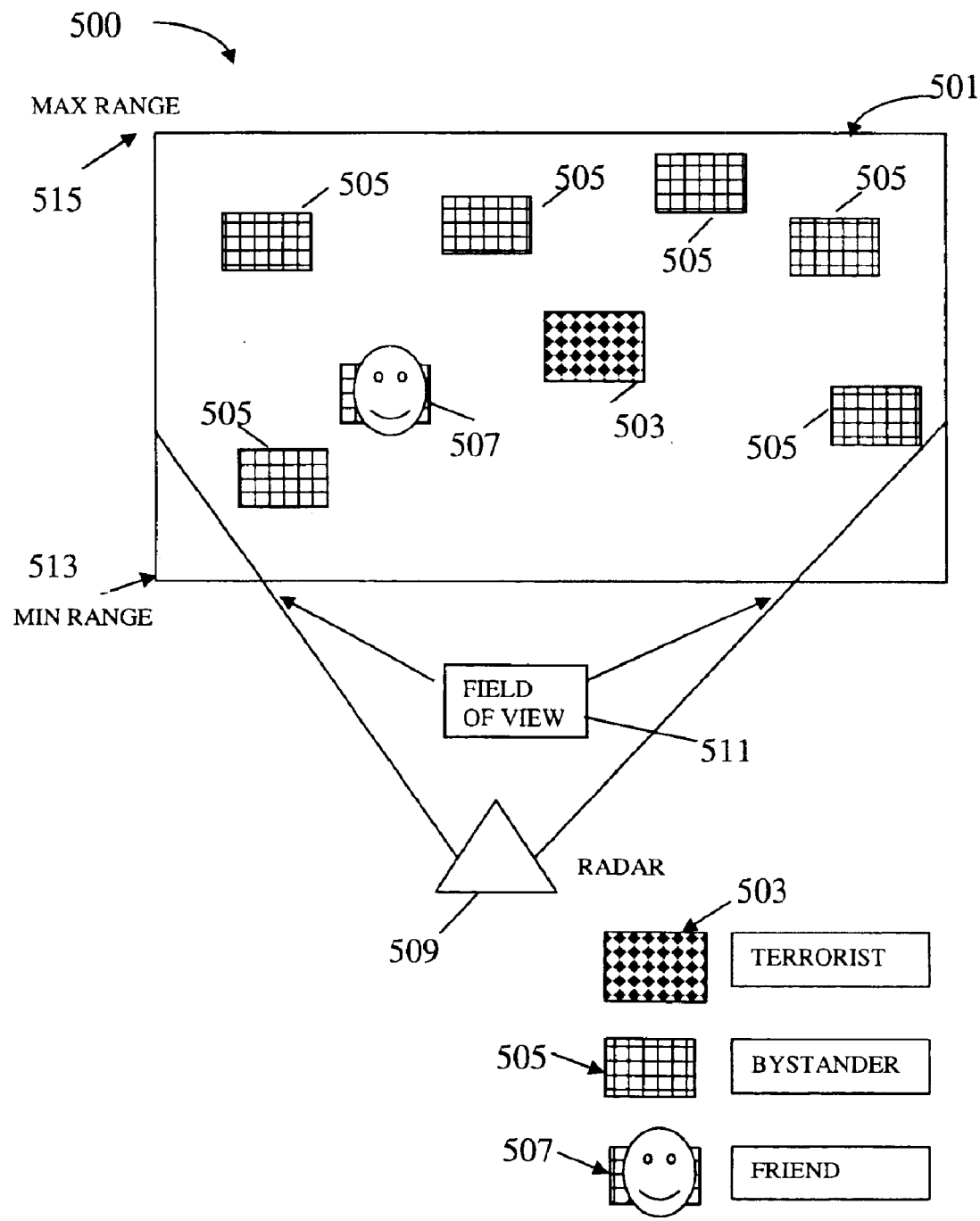
FIG. 5 illustrates the appearance of the image display on the monitor, in the perspective view, through the target acquisition process including superimposing rectangles on populated cells, displaying on cells symbols identifying a friend or a foe, and the use of different colors corresponding to areas found to correspond to different threats and/or other differences in information associated with the particular cells.

FIG. 5 illustrates a radar 509 covering a field of view 511, either indoor or outdoor, and displaying information collected on a screen display 501, subdivided into range azimuth cells 503, 505, 507. Each area of the rectangular portion of visual display 501 corresponds to a different area, e.g., cell, of a scanned region. The radar may be coordinated with a camera aiming direction and zoom setting. The radar may pan within its controlled setting automatically. The radar may also be selectively controlled and aimed by an operator to point at a specific target, e.g. a suspected terrorist. The bottom of the screen display 513 corresponds to the minimum range of radar coverage used for evaluation and presentation, while the top of the screen display 515 corresponds to the maximum range of radar coverage used for evaluation and presentation. Some of the range azimuth cells of screen display 501 may be populated, assuming the radar has acquired targets within its designated coverage area. FIG. 5 includes such exemplary populated range azimuth cells, 505, 507, 503. Each populated range azimuth cell appears on screen display 501 as an array of rectangles, the location of each array of rectangles on the screen in relation to the minimum range 513, maximum range 515, and azimuth with respect to the radar field of view 511 definition, can be used to determine the position of the populated range azimuth cell, e.g. acquired target. Each identified populated range azimuth cell displayed in the threat arena, has been highlighted, in accordance with the invention, with a symbolic code and/or color for identification. In the particular example, display of populated cells is limited to cells populated with at least one human being. However, in mine detection and/or other applications displayed populated cells may include cells populated with a device such as a weapon which may pose a security threat.

Exemplary rectangle 505 shown with grid lines and with no symbolic overlay, represents a bystander. Rectangle 507 shown with a smiley face superimposed on the grid lines represents an identified friend, rectangles 507 are colored green in some embodiments. Rectangle 503 shown with shaded diamonds superimposed on the grid lines represents a terrorist; rectangles 503 are colored red in some embodiments to distinguish them through the use of color from other cells. The FIG. 5 illustration may, and sometimes is, superimposed on an image of the region being examined provided by a camera or by a stored map whose location registration is obtained e.g., by Global Positioning Satellite system tags, by a forward observer designation, by reference to known landmarks, or some other known technique.

Figures 6, 6A:
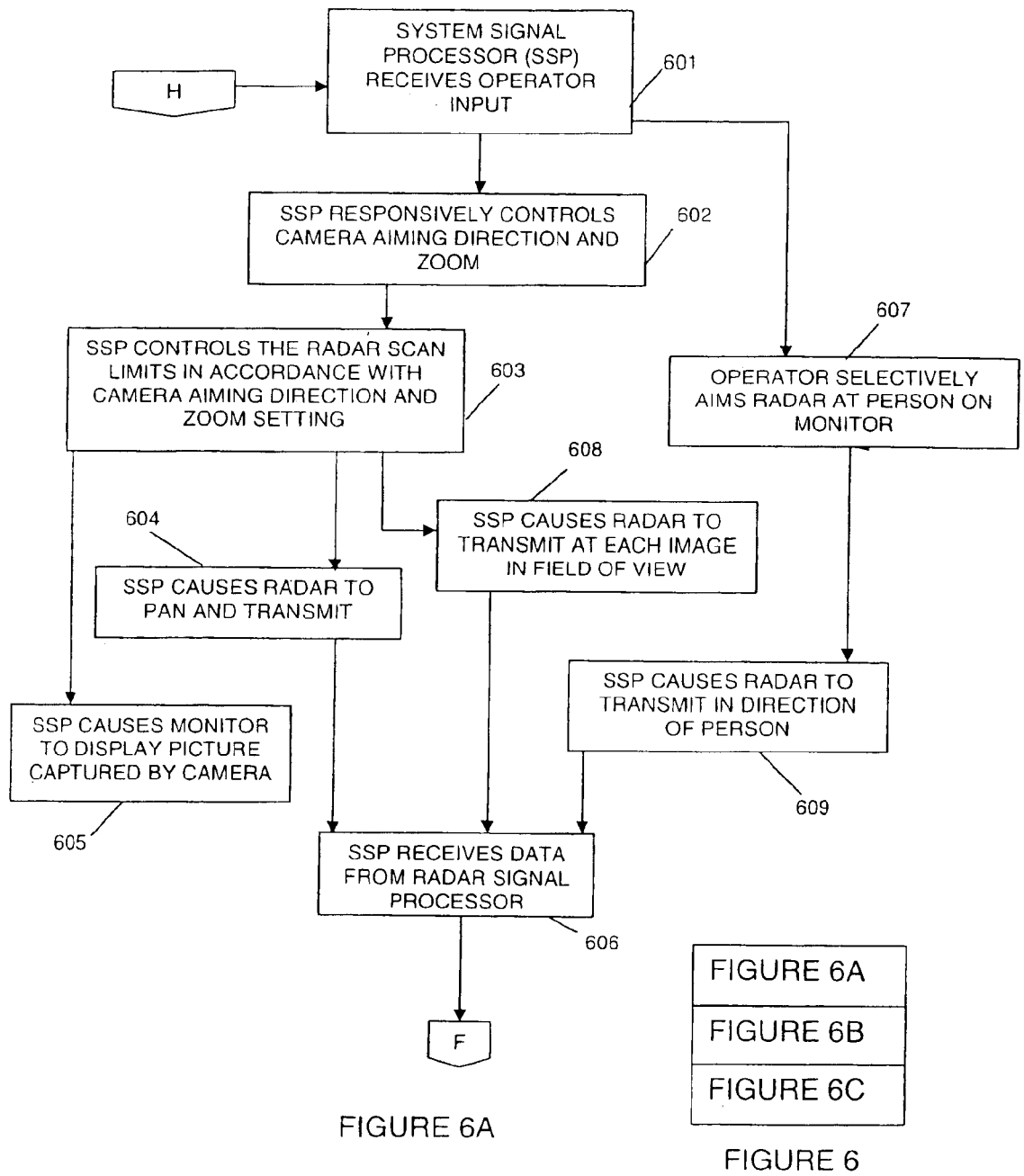
FIG. 6, which comprises the combination of FIGS. 6A, 6B, and 6C is a flow chart illustrating steps performed by a System Signal Processor in accordance with the method of the present invention in which the data is presented in the video image view.

Each of the various exemplary cell based detection methods of the present invention can support a "video image" view and a "perspective" view. FIGS. 6 and 7 may be used to illustrate the steps performed by a System Signal Processor 106 in accordance with various method of the present invention. FIG. 6 comprises the combination of FIGS. 6A, 6B, and 6C. FIG. 7 comprises the combination of FIGS. 6A, 7B and 7C. Both embodiments use the exemplary set of threat threshold determination steps shown in FIG. 8.

In the embodiment of the process flow of FIGS. 6 and 7, the previously described two different innovative representations, video image view and perspective view, of the threat environment are both possible with the user being able to switch between information presentation formats through the use of user input, e.g., entry of a command or pressing a button.

Regardless of the information display format, the SSP 106 calculates the returned energy content of the Scene 109 for the various cells. In various embodiments, the SSP 106 beneficially causes the Monitor 102 to display the previously described rectangles corresponding to the locations of the populated range-azimuth cells. The rectangular grids may be, and often are, superimposed on a camera image of the area being examined. The cell or cells corresponding to an individual whose returned signal is determined to be indicative of an individual who is wearing or carrying explosives or weapons, i.e., a threatening individual, would be advantageously color-coded red or by other means symbolically delineated. In some embodiments, the populated range-azimuth cells corresponding to non-threatening individuals would be advantageously color-coded green or by other means symbolically delineated. A populated range-azimuth cell whose return exceeded the established threshold but returned a Friend indication in response to an interrogation system would be advantageously color-coded green or by other means symbolically delineated, including an indication that the cell corresponds to an ally.

The flow chart in FIG. 6 will be described with reference to the video image display option wherein image areas corresponding to cells have grids superimposed thereon. Referring to FIG. 6A, the SSP 106 receives input from the operator in step 601, and in response to the input, controls the camera aiming direction, and the size of the photographed scene (zoom) in step 602. The SSP 106 then causes the Radar scan limits to be in accordance with the camera's aiming direction and zoom settings in step 603. Thus, the region being scanned corresponds to the camera viewing area and the area into which radar signals are transmitted. In step 604 and 605, the SSP 106 causes the radar 101 to pan according to the scan limits and transmit a continuous signal; the SSP 106 also causes the monitor 102 to display the picture as photographed by the camera 103. In step 608, the SSP 106 causes the radar 101 to transmit at each image in the field of view. In step 607, the operator may also selectively aim the radar 101 at a person to be monitored, in which case the SSP 106 in step 609 causes the radar 101 to transmit in the direction of the selected person. In step 606, the SSP 106 receives the detected signal from the radar 101 which may come from: the radar pan of step 604, the radar directed at the images within the field of view of step 608, or the radar directed by operator targeting a person of step 609. The SSP 106 coordinates the transmitted signal with the received signal so as to be able to correlate received levels with specific range-azimuth cells, e.g., different areas of a scanned region.

Figure 6B:
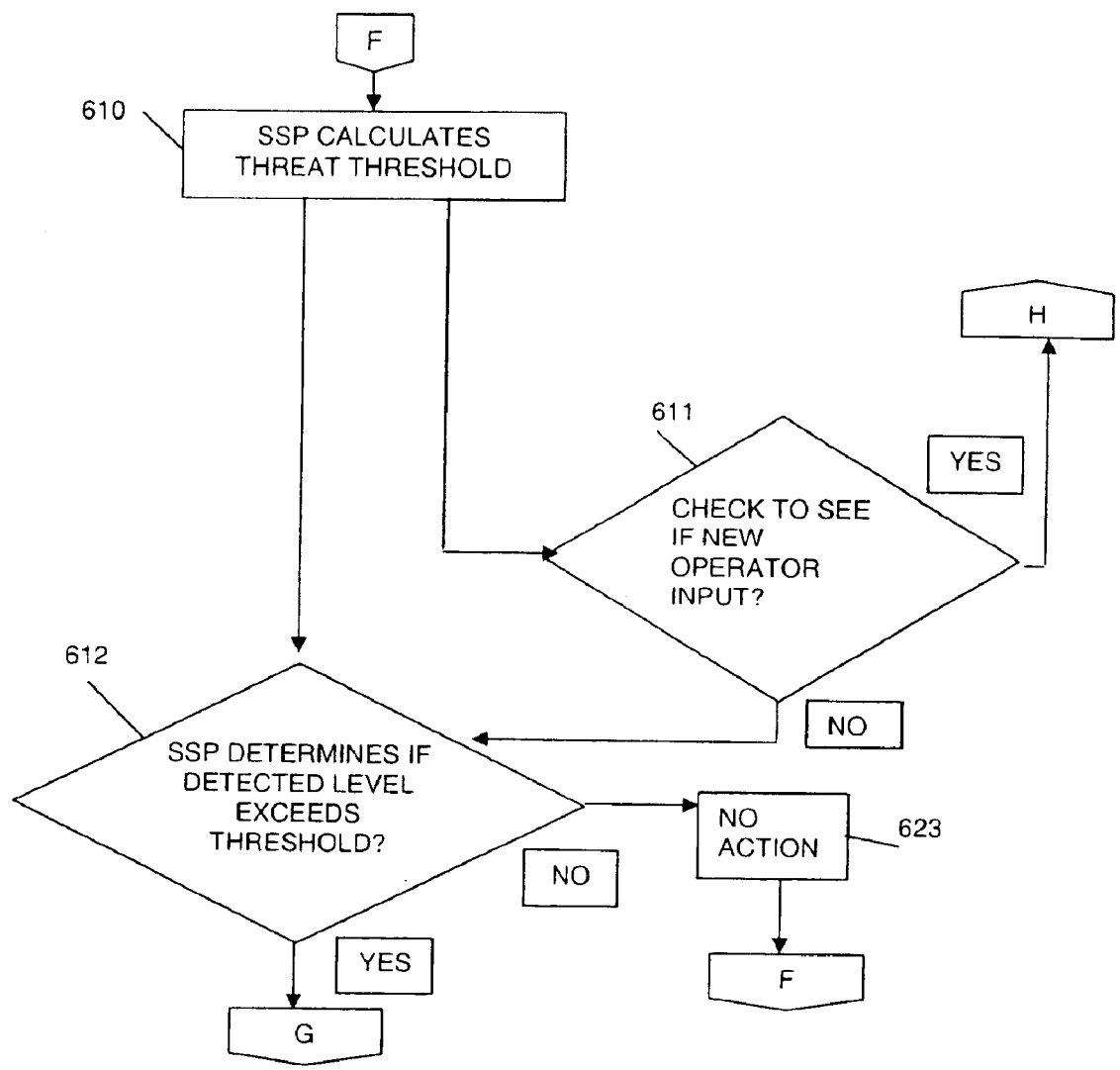
Figure 7B:
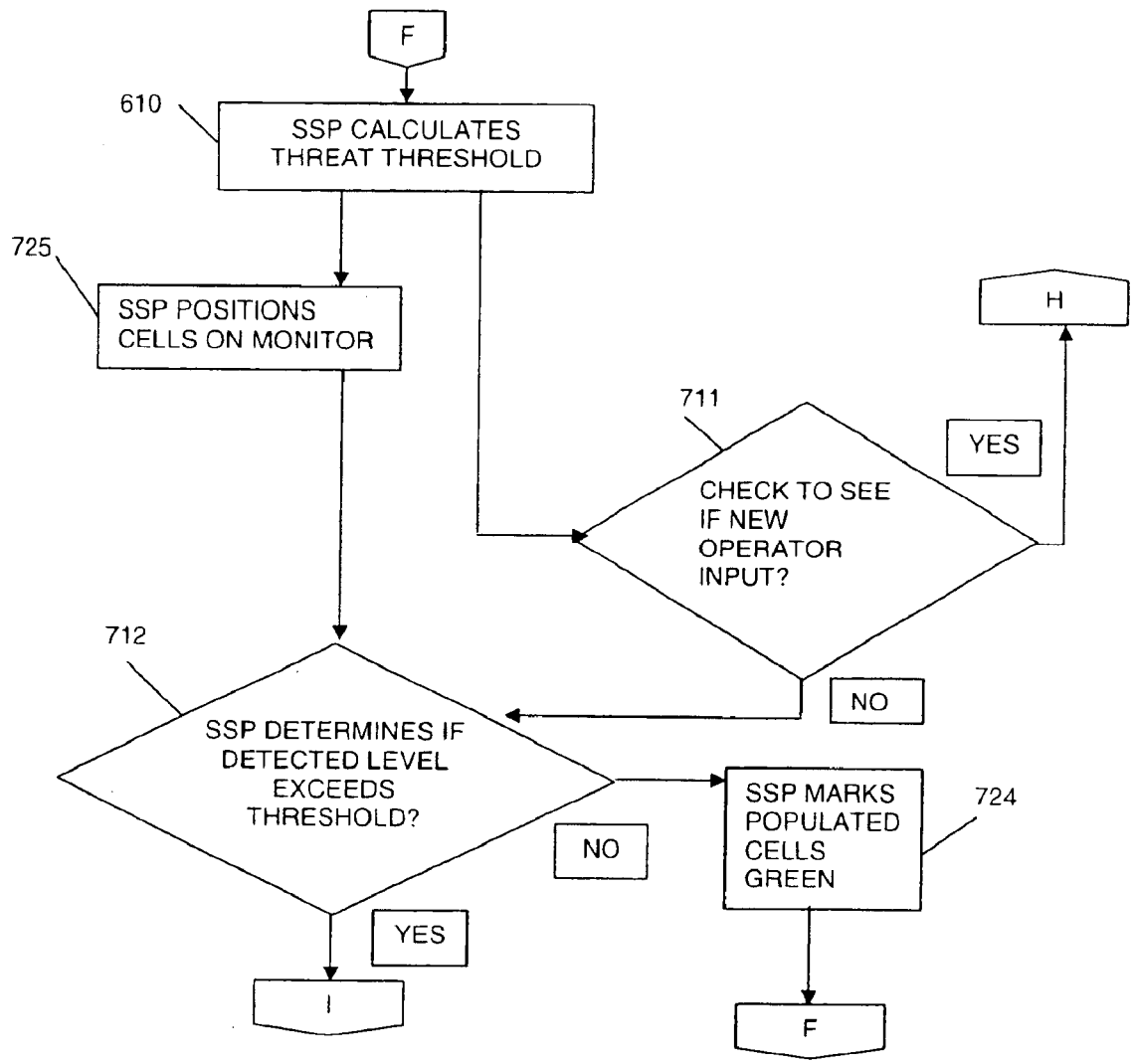
FIG. 7, which comprises the combination of FIGS. 6A, 7B, and 7C is a flow chart illustrating steps performed by a System Signal Processor in accordance with the method of the present invention in which the data is presented in the perspective view.
Figure 7C:
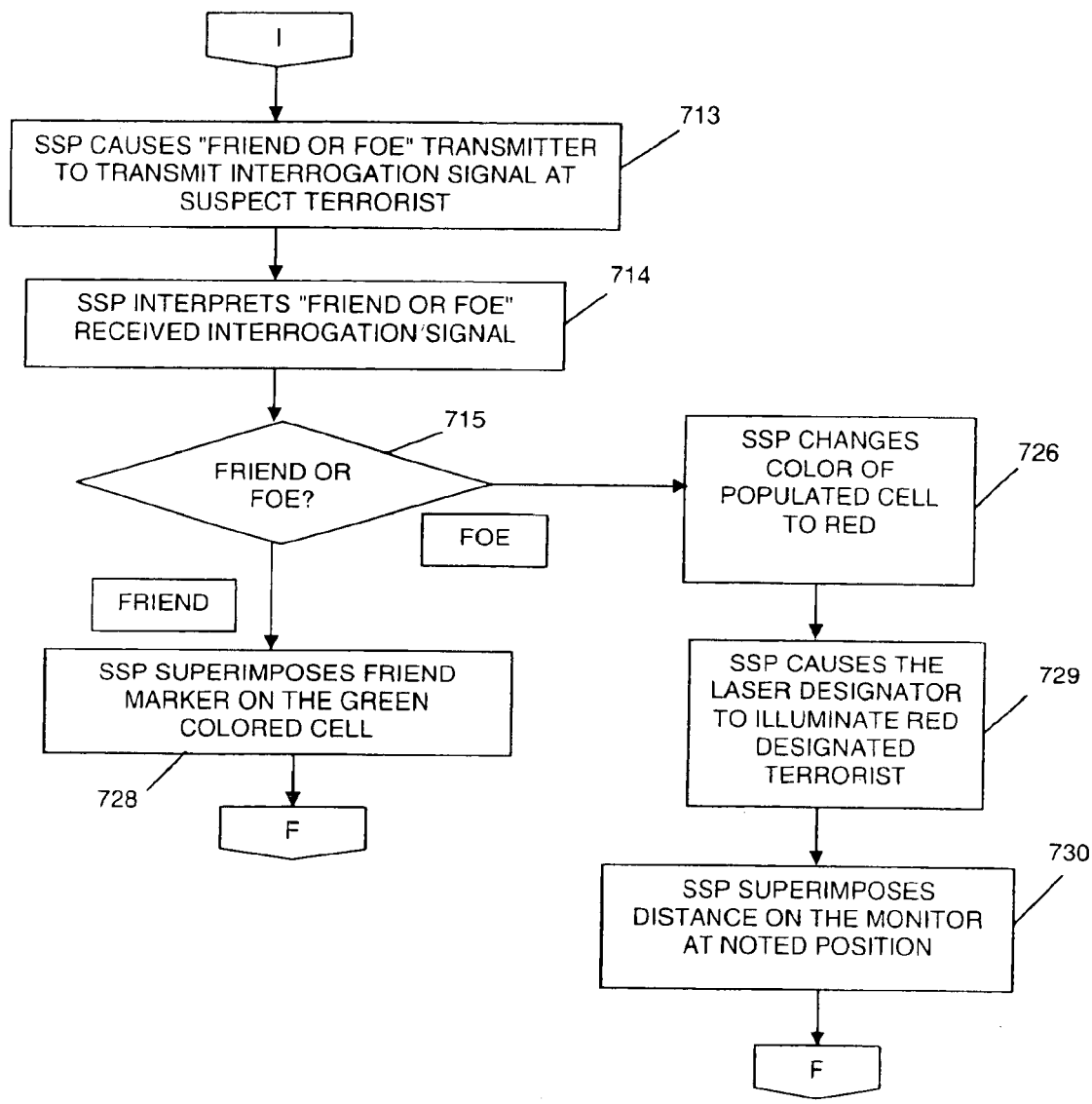

Referring to FIG. 6B, the SSP 106 next dynamically calculates the average of the received detected levels for each of the populated range-azimuth cells and the threat threshold in step 610. The threat threshold may be generated by averaging the detected energy corresponding to different cells after weighting the measured energy corresponding to the different cells as a function of the distance the radar signal traveled before reaching the detector of Radar 101.

Figure 8:
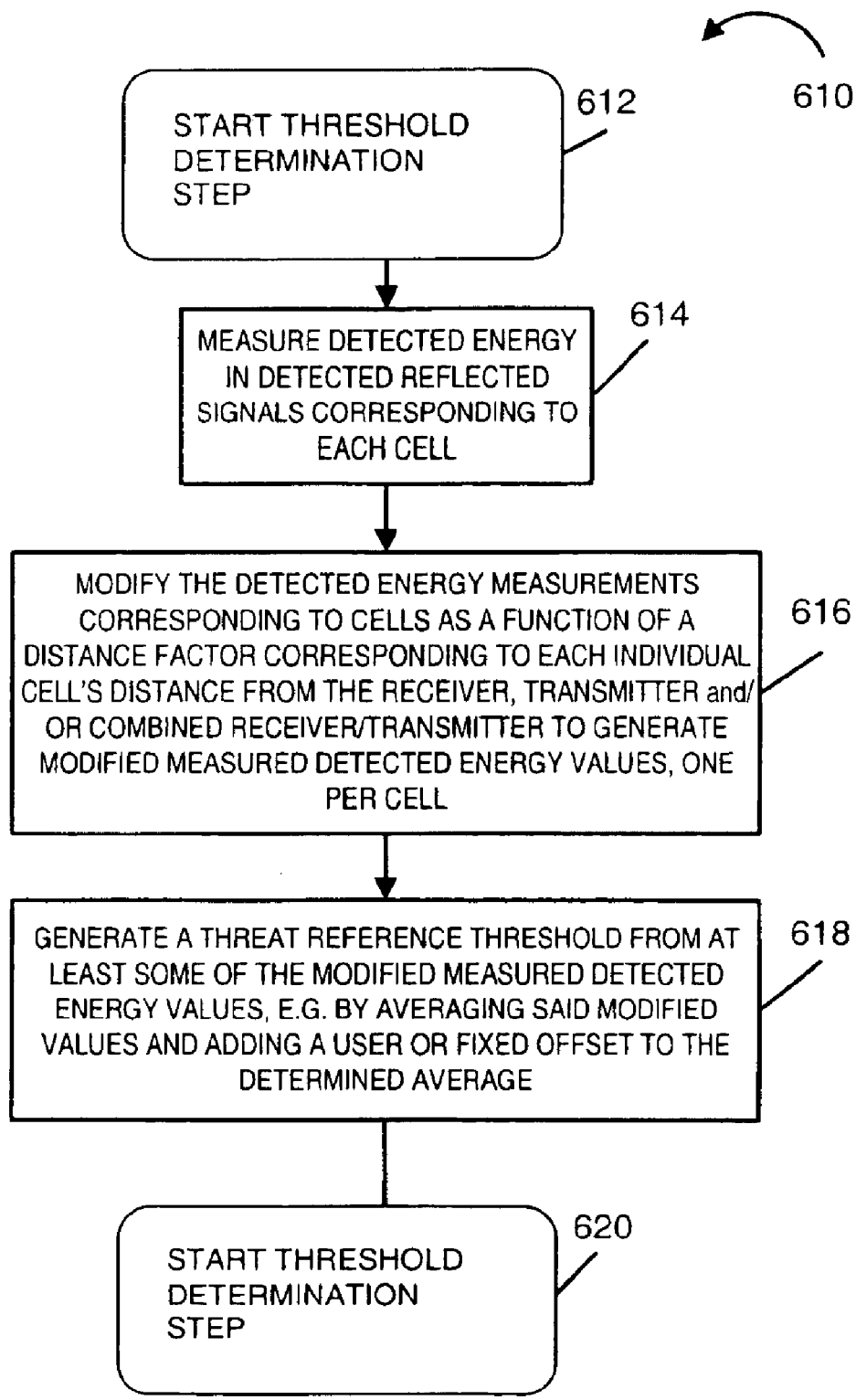
FIG. 8 illustrates various steps which are performed in an exemplary embodiment to dynamically generate a threat threshold to be used in analyzing different cells of a scene in an attempt to detect the presence of a threat.

Referring now briefly to FIG. 8, an exemplary set of steps which can be used to implement the threat threshold determination step 610 are shown. The threat determination step starts in node 612. Then, in step 614 a signal characteristic, e.g., energy, in the detected reflected signals corresponding to each cell is measured to produce a measured signal value. This results in a measured signal value, e.g., a detected energy measurement value, for each cell. Next, in step 616 the detected energy measurement value corresponding to each of the cells is modified according to the distance of the cell to which a measurement value corresponds from the receiver (detector), transmitter and/or combined receiver/transmitter. This modification may be performed by multiplying an energy measurement value by a factor which is determined as a function of distance. Such a factor can be described as a distance factor since it is a function of the distance to the cell of interest. For example, measurements corresponding to cells furthest away may be multiplied by a maximum factor which is greater than one while closer cells are multiplied by smaller factors. The closest cells are multiplied by the smallest factors to take into consideration that the signals from these near cells should be the strongest since they have to travel the shortest distance. In this manner, detected energy values from different cells can be normalized for comparison purposes by taking into consideration the effect of the distance on the detected amount of energy. The energy measurement value modification process performed in step 616 produces a set of modified measured detected energy values, e.g., one per cell.

From step 616 operation proceeds to step 618 wherein a threat reference threshold is generated from the modified measured detected energy values corresponding to one or more cells. It should be noted that in steps 616 and 618 all values need not be used. For example, exceptionally high or low values may be discarded and/or values corresponding to cells with known unusual radar characteristics may also be discarded. Thus, the threat threshold may be generated from a particular subset of the values corresponding to the cells which have been scanned, e.g., values corresponding to populated cells. In step 618, in the exemplary embodiment, the modified measured detected energy values are averaged to generate an average detected modified energy value to which a user selected or pre-selected offset is added to generate the threat threshold used to analyze the cells during the particular scan period. With the threat threshold determined, the threat threshold determination processing stops as indicated in node 620.

Referring once again to FIG. 6, with the threat threshold having been determined in step 610, operation proceeds to step 611. In step 611, the SSP 106 checks to see if new operator input had been received, and if so, returns to step 601. If there has not been new operator input, operation proceeds to step 612, wherein the SSP 106 determines if the detected level has exceeded the threshold. If the detected level has not exceeded the threshold, the SSP 106 takes no declarative action in step 623, returns to step 610, and continues to calculate the average of the detected levels for each populated range-azimuth cell and the threshold. If the detected level has exceeded the threshold, operation proceeds to step 613.

Figure 6C:
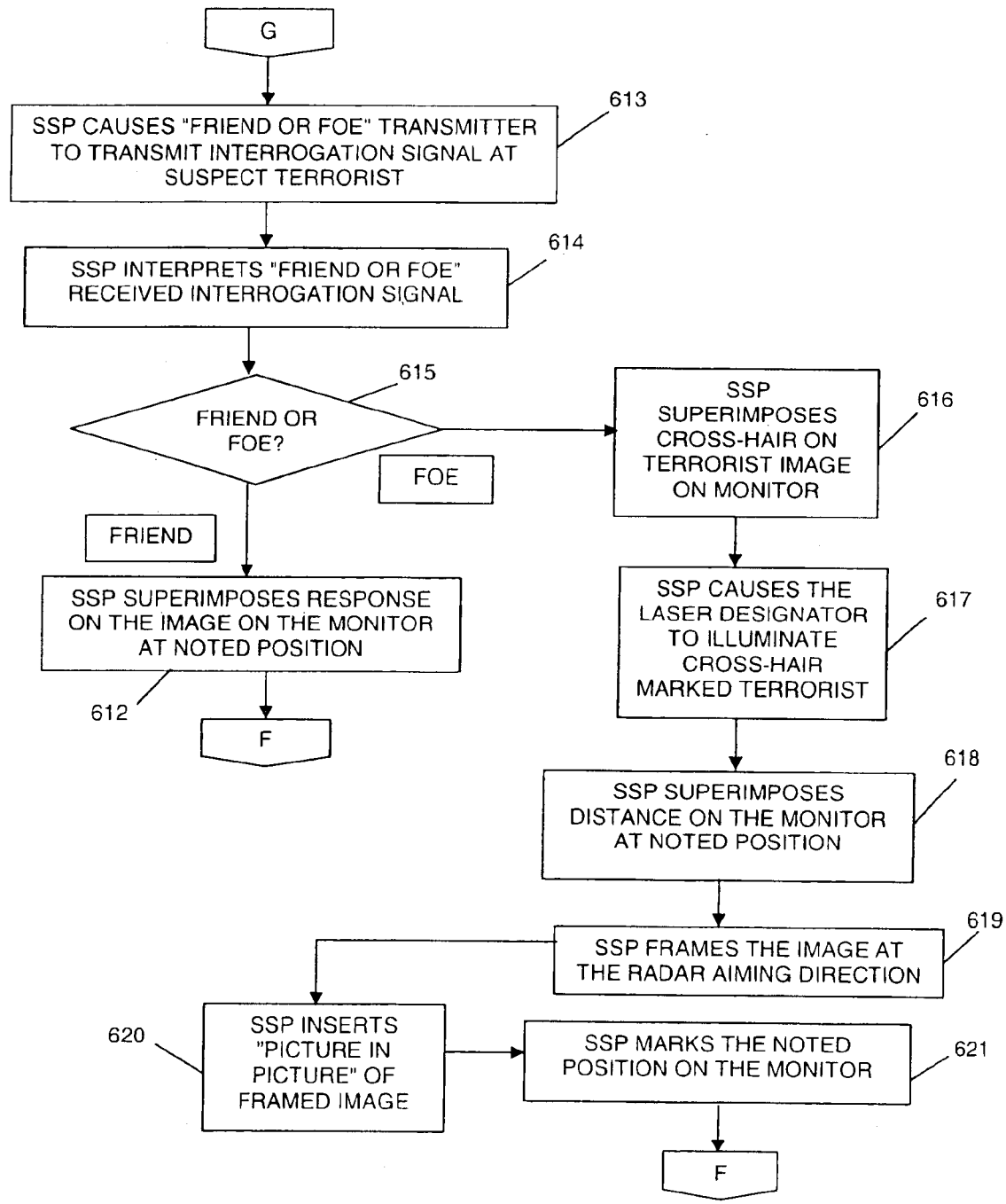

Referring to FIG. 6C, in step 613, the SSP 106 causes the "Friend or Foe" transmitter to transmit an interrogation signal in the direction of the suspect terrorist, e.g., the direction of the populated range-azimuth cell that has exceeded the threshold, and in step 614 the SSP 106 receives the response signal, if any. In step 615, the SSP 106 determines whether there was a pre-determined "Friend" response, and if so, classifies the target as "Friend" and proceeds to step 622, where the SSP 106 superimposes the "Friend" marker on the Monitor 102 at the Noted Position corresponding to the time of the threshold being exceeded and then returns to step 610.

If the pre-determined "Friend" response is not detected in step 615, the SSP 106 superimposes a cross-hair on the terrorist image on the monitor 102 in step 616. Next, in step 617 the SSP 106 causes the laser designator 104 to illuminate the cross-hair marked terrorist. In step 618 the SSP 106 superimposes distance on the Monitor 102 at the Noted Position. Next, the SSP 106 frames the image at approximately the size of a human at the Noted Position and in step 619 inserts that framed image as a "picture in picture" in a corner of the Monitor 102. Simultaneously, the SSP 106 marks the Noted Position on the primary display of the Monitor 102 at step 621. From step 621 the SSP 106 returns to step 610.

FIG. 7 shows the steps associated with generating the perspective view illustrated in FIG. 5. FIG. 7 comprises the combination of FIGS. 6A, 7B and 7C. Accordingly, the initial processing is as already described in regard to FIG. 6 but with the processing proceeding from step 606 of FIG. 6A to step 610 of FIG. 7B. Referring to FIG. 7B, the SSP 106 dynamically calculates the threat threshold in step 610 from the average energy of the received detected returned signal for some or all of the range-azimuth cells, e.g., the populated cells, as modified to reflect the effect of different cell distances on the returned energy from various cells. In step 725 the SSP 106 positions the aforementioned rectangles on the monitor 102 corresponding to the location in the scene of the populated cells. In step 711, the SSP 106 checks to see if new operator input had been received, and if so, returns to step 601. If new operator input has not been received, operation proceeds to step 712, wherein the SSP 106 determines if the detected level for each range-azimuth cell exceeded the threshold. If not, it colors the corresponding rectangle "green" in step 724 and returns to step 710 and continues to calculate the average of the detected levels for each populated range-azimuth cell and the threshold. If yes, it proceeds to step 713.

Referring to FIG. 7C, in step 713, the SSP 106 causes the "Friend or Foe" transmitter to transmit an interrogation signal at the suspect terrorist. Proceeding to step 714, the SSP 106 interprets the received response, if any, to the "Friend or Foe" interrogation signal. In step 715, the SSP 106 determines whether there was a pre-determined "Friend" response, and if so, classifies the target as "Friend" and proceeds to step 728. In step 728 the SSP 106 identifies the cell as a "Friend" on the perspective display by coloring the cell green and superimposing the "Friend" marker on the cell located at the Noted Position corresponding to the populated range-azimuth cell that had exceeded the threshold, yet returned an acceptable "Friend" identification response signal. From step 728 operation returns to step 710, where the monitoring process continues.

If the pre-determined "Friend" response is not detected in step 715, the SSP 106 next changes the color of the populated cell to red in step 726 and superimposes the "Terrorist" marker on the cell. The SSP 106 next causes the laser designator 104 to illuminate the red designated terrorist by directing the laser designator 104 in the Radar aiming direction corresponding to the Noted Position at step 729. Next, in step 730, the SSP 106 superimposes distance on the view at the noted position.

While the initial embodiments have been particularly shown and described with reference to the specific application of homicide bomber detection, it will be understood by those skilled in the art that other embodiments and/or various changes in form and detail, including tradeoffs of Radar design parameter selection, may be made therein without departing from the spirit and scope of the invention and that other applications are addressable with the spirit and scope of the invention. Other applications include perimeter security, side-attack mines (off-route mine detection), through-the-car window vehicle check-point occupant threat assessment and personnel detection and warning for perimeter, ambush and casualty detection. In various implementations, different visual identifiers may be used for different types of detected threats, e.g., mines may be indicated on a display differently from a human who is determined to be armed.

While the invention has been particularly shown and described with reference to the preferred embodiments thereof, it will be understood by those skilled in the art that various changes in form and detail, including tradeoffs of Radar design parameter selection, may be made therein without departing from the spirit and scope of the invention.

What is claimed is:

1. A method for facilitating detection of a threat, the method comprising:
    i) operating a transmitter to transmit signals in the direction of a plurality of cells to pan a scene corresponding to said plurality of cells, at least some cells corresponding to different ranges relative to the transmitter;
    ii) operating a detector to detect reflected signals during an analysis period received from said plurality of cells; and
    iii) determining a threat reference threshold for the analysis period as a function of the reflected signals detected during the analysis period, said step of determining a threat threshold including:
        measuring detected reflected signals corresponding to at least some of said plurality of said cells to generate a measured signal value for each particular one of said at least some cells;
        modifying the measured signal values corresponding to some particular ones of said at least some cells by a distance factor corresponding to the distance the particular one of the cells is from the transmitter to generate a modified measured signal value for each of said some particular ones of said cells; and
        generating the threat reference threshold as a function of at least some of the modified measured signal values.

2. The method of claim 1, wherein generating the threat reference threshold includes:
    averaging the modified measured signal values corresponding to a plurality of cells in which at least one human being is located; and
    and establishing said threat reference threshold from the generated average.

3. The method of claim 2, further comprising:
    comparing the modified measured signal values of at least some cells to the threat reference threshold; and
    signaling a threat when said comparison indicates that the modified measured signal value of one of said at least some cells exceeds said threat reference threshold.

4. The method of claim 3, wherein signaling a threat includes:
    displaying an image corresponding to said plurality of cells on a display device; and
    locating a visual marker on the portion of the displayed image corresponding to each cell that has a modified measured signal value that exceeds said threat reference threshold.

5. The method of claim 4, wherein said step of displaying an image includes:
    operating a processor to generate a perspective view of the plurality of cells, the perspective view including:
    preselected shapes used to indicate detected information about different cells; and
    cell distance information.

6. The method of claim 3, further comprising:
    marking displayed cells having modified measured signal values exceeding said threshold in a distinctive manner on said display to distinguish them from displayed cells which do not have modified measured signal values exceeding said threat reference level.

7. The method of claim 6, wherein marking displayed cells in a distinctive manner includes using a first display color for cells having modified a measured signal value exceeding said threat reference level and a second color for cells which do not have a modified measured signal value exceeding said threat reference level, said first color being different from said second color.

8. The system of claim 7, further comprising:
    receiving a friend indicator signal from a cell with a modified measured signal value exceeding said threat reference level; and
    distinctively marking the cell corresponding to the received friend indicator signal to indicate the presence of a friend in the corresponding cell.

9. The method of claim 8, further comprising:
    leaving cells which do not have a human presence blank in said displayed image.

10. The method of claim 1,
    wherein said transmitted signals are radar signals,
    wherein each cell corresponds to a different transmitter azimuth and range; and
    wherein the method further comprises:
        periodically repeating steps i, ii, and iii.

11. The method of claim 1, wherein said measured signal values are energy values.

12. A system for detecting a threat located in one of a plurality of areas corresponding to different locations, the system comprising:
    a transmitter that transmits radar signals in the direction of said plurality of areas;
    a detector which detects a reflected portion of the signals, the detector measuring the energy in the detected reflected portion of the signals corresponding to each area, to generate a detected energy measurement for each particular one of said areas;

means for modifying the detected energy measurements corresponding to some areas by a distance factor corresponding to the distance the area is from the transmitter to generate a modified measured detected energy value for each of said some areas;

means for generating a threat reference threshold as a function of at least some of the modified measured detected energy values; and a comparator for comparing at least some of the modified detected energy measurements to said threat reference threshold to identify areas of possible threats indicated by the modified detected energy measurement of an area exceeding said threat reference threshold.

13. The system of claim 12, further comprising:

a display processor; and a display, said display processor generating a visual representation on said display of at least some of said plurality of areas and indicating on said visual representation areas having modified detected energy values which exceed said threat reference threshold.

14. The system of claim 13, wherein said visual representation includes distance information.

15. The system of claim 14, wherein a first display color is used to mark areas of the visual representation corresponding to areas having modified detected energy values which exceed said threat reference threshold and a second display color is used to mark areas having modified detected energy values which are below said threat reference threshold, said first and second colors being different.

16. The system of claim 15, further comprising:

a receiver for receiving friend indicator signals from said areas, said visual representation including a friend indicator marker on display areas corresponding to an area from which a friend indicator signal was received.

17. The system of claim 16, wherein said visual representation includes a visual image of the physical areas to which each visual representation image area corresponds.

18. The system of claim 12, wherein said means for generating the threat reference threshold includes:

means for averaging the modified detected energy values corresponding to a plurality of cells.

19. A method for facilitating detection of a threat, the method comprising:

i) operating a transmitter to transmit signals in the direction of a plurality of cells to pan a scene corresponding to said plurality of cells;

ii) operating a receiver to detect reflected signals during an analysis period received from said plurality of cells, at least some of said cells being at different distances from the receiver; and iii) determining a threat reference threshold for the analysis period as a function of the reflected signals detected during the analysis period, said step of determining a threat threshold including:

measuring detected reflected signals corresponding to at least some of said plurality of said cells to generate a measured signal value for each particular one of said at least some cells;

modifying the measured signal values corresponding to some particular ones of said at least some cells by a distance factor corresponding to the distance the particular one of the cells is from the receiver to generate a modified measured signal value for each of said some particular ones of said cells; and generating the threat reference threshold as a function of at least some of the modified measured signal values.

20. The method of claim 19, wherein generating the threat reference threshold includes:

averaging the modified measured signal values corresponding to a plurality of cells in which at least one human being is located; and and establishing said threat reference threshold from the generated average.

21. The method of claim 20, wherein the measured signal values are energy values.

22. The method of claim 19, wherein said scene is an outdoor scene.

23. The method of claim 18, wherein said scene is an indoor scene.

* * * * *